Dec. 17, 1957  M. CONRAD  2,816,997
RESISTANCE THERMOMETER
Filed Feb. 23, 1955

INVENTOR.
MATTHEW CONRAD
BY

ATTORNEYS

United States Patent Office 2,816,997
Patented Dec. 17, 1957

2,816,997

RESISTANCE THERMOMETER

Matthew Conrad, Philadelphia, Pa., assignor to The Waters Corporation, Rochester, Minn., a corporation of Minnesota Application February 23, 1955, Serial No. 489,835

16 Claims. (Cl. 201—63)

This invention relates to resistance thermometers and has particular reference to such thermometers of very minute size suitable for incorporation in hypodermic needles or catheters for use in measuring local temperatures in the human or other animal bodies.

The problems solved in accordance with the present invention are best exemplified in its adaptation to the provision of thermometers in the form of hypodermic needles.

It is desirable both in medical research and in clinical treatment of patients to determine local temperatures of organs, the measurements in many cases to be made in very localized regions. These requirements dictate the desirability of incorporating a minute temperature measuring element in a hypodermic needle so that it may be located precisely in the particular tissues or organs in which temperature measurements are desired. Previous attempts have been made to attain these results through the use of thermocouples, but lead resistances and all of the necessary contacts are involved in such measurements as well as thermocouple drifts, and complex apparatus is required for the reading of temperatures.

In accordance with the present invention, the temperature-sensitive elements used are thermistors, i. e., resistance elements having high temperature coefficients and adapted to have their resistances varying with temperature measured through the use of a relatively simple Wheatstone bridge arrangement. Thermistors have been proposed for use in the measurement of body temperatures, but difficulties are experienced in providing suitable satisfactory elements of the minute size required.

It is a broad object of the present invention to provide thermistor temperature measuring elements of minute size which are properly insulated and thoroughly reliable in operation. The invention is applicable not only to the production of hypodermic needles of the type referred to above but to the production of catheters for temperature measurements as well. The foregoing broad object and other objects particularly relating to details of manufacture and construction will become apparent from the following description read in conjunction with the accompanying drawing, in which.

Figure 1:
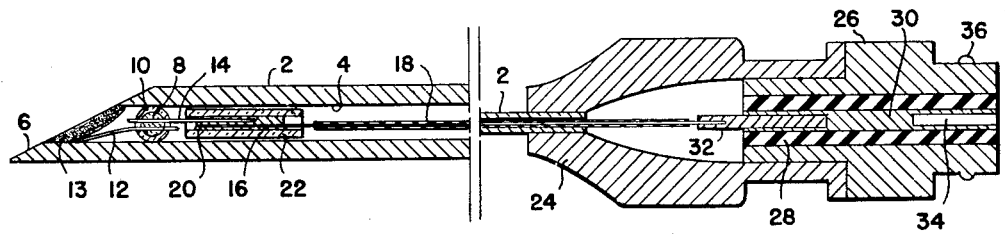
Figure 1 illustrates, in axial section and partially broken away, a hypodermic needle provided in accordance with the invention, the left-hand portion of this figure being considerably magnified as compared with the right-hand portion thereof.

Reference may be made first to Figure 1 which illustrates the application of the invention to a hypodermic needle wherein the small dimensions create the major problems of construction which are encountered.

A hypodermic needle is indicated at 2 and takes the form of a tube of stainless steel or platinum alloy having a bore 4. In order to give an indication of typical dimensions involved, the outside diameter of a typical needle may be of the order of 0.028 inch while the bore may have a diameter of the order of 0.0145 inch. Other dimensions hereafter given will be those consistent with such a needle.

The needle is bevelled at its pointed end as indicated at 6, and adjacent to the pointed end there is located a thermistor bead 8 having a glass coating 10 with lead wires 12 and 14 extending oppositely from the bead. In the typical needle referred to, the bead may have an outside diameter of approximately 0.013 inch, and the leads taking the form of platinum wires may have diameters of 0.002 inch. The lead 12 illustrated in Figure 1 is soldered at 13 to the needle, the solder closing the end of the bore at the needle point. The other lead 14 is soldered to the bare end 16 of an insulated lead wire 18 which extends through the needle. The end 16 overlaps a portion of the lead 14 and is soldered thereto within a capillary glass tube 22 which provides not only insulation but a jig for soldering as hereafter described in greater detail. The conductor of the lead wire 18 may be copper or nickel.

The shank end of the needle 2 is soldered or otherwise secured within a hub 24 to which there is soldered or otherwise secured a connector element 26 suitable for making connection to a coaxial cable. The element 26 is metallic and within a bore therein there is an insulating sleeve 28 within which, in turn, there is a metal fitting 30 provided with a pin 32 secured to the conductor of the wire 18, the fitting 30 being provided with a socket 34 for the reception of a central pin in a mating connector forming part of a coaxial cable. An interrupted ring 36 on the connector 26 serves for a bayonet type connection to the sheath of the coaxial cable.

The construction which has been generally outlined above may be better understood by detailed consideration of the steps involved in assembly.

Figure 2:
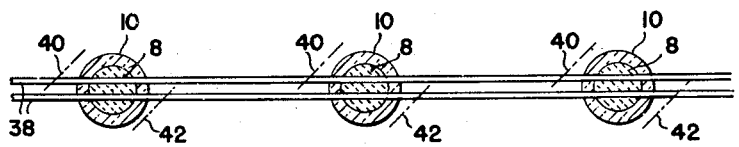
Figure 2 is a diagrammatic showing of a step in the procedure for making thermistor elements for use in a construction such as that shown in Figure 1.

Referring to Figure 2, the thermistor elements and their leads are desirably formed as follows:

A pair of platinum wires, which ultimately provide the leads 12 and 14 already mentioned, are stretched in parallel arrangement as indicated in Figure 2 and bridging and surrounding them there are provided beads of the thermistor material. Various materials of the types commonly used for thermistors may be here used, such as suitable mixtures of nickel and manganous oxides which are sintered to provide the beads. These beads are then coated with glass which is fused thereon to provide insulation. Following this, the wires are severed as indicated by the planes 40 and 42 adjacent to the beads to provide the oppositely extending leads 12 and 14. The next step in the formation of the needle involves the insertion of the lead 14 in overlapping relationship with the end 16 of the lead wire 18 within the bore of a capillary glass tube 22 having an outside dimension sufficiently small to enable it to pass through the bore of the needle. The overlapping relationship is advantageous in securing the best junction, though the ends may be only abutted, if desired, the solder providing a bridge between them. Powdered solder, for example of 180 mesh, is introduced into the bore to surround the leads therein, which are preferably pretinned, and flux coated with the solder adhered to the flux coating and heat is applied to fuse the solder to provide a soldered joint between the leads within the glass tube. Not only does the tube ultimately act as an insulator holding the leads spaced from the inner wall of the needle, but it performs the very important function of acting as a jig for holding the leads and the powdered solder in position during the soldering operation. Using a proper amount of solder, it becomes confined completely within the bore of the capillary tube.

While the tube has been mentioned as formed of glass, other insulating materials may be used which are refractory in the sense of withstanding the heat of soldering. There may be used a solder consisting of a eutectic mixture of tin and lead, i. e., 63% tin and 37% lead having a minimum melting point. To provide uniform insulated tubing, it has been found that not only may glass be used but Teflon tubing may also well be used, and this tubing may be provided to accurate dimensions by starting with short lengths of Teflon-insulated copper wire of suitable outside and inside dimensions of the Teflon insulation, the copper wire being removed from these lengths by gradual solution in dilute nitric acid.

Before insertion into the tube, the leads are desirably pretinned and coated with flux, a desirable coating being provided by rosin dissolved in methanol. The powdered solder is preferably introduced by adhesion to the flux-coated ends of the leads.

The assembly provided as above is then inserted within the needle, properly located adjacent to the bevel point thereof, and the lead 12, pretinned and flux coated, is then soldered to the interior of the needle by solder indicated at 13 which is supplied in sufficient amount to close the bore of the needle as well as to effect fixation of the lead 12. Following this soldering operation, the end of the needle may be ground to a sharp point, external excess of solder being removed in this operation. Complete sealing of the bore is thus effected.

The final assembly of the lead 18, connector 26, needle and needle hub offers no particular difficulty and may be readily carried out through obvious soldering techniques. In the final electrical connection, the lead 18 is joined to the central conductor of a coaxial cable the sheath of which is secured to the connector through the bayonet joint arrangement already mentioned.

It may be remarked that the lead 12 may be secured adjacent to the pointed end of the needle by spot welding or swaging rather than by soldering.

Figure 3:
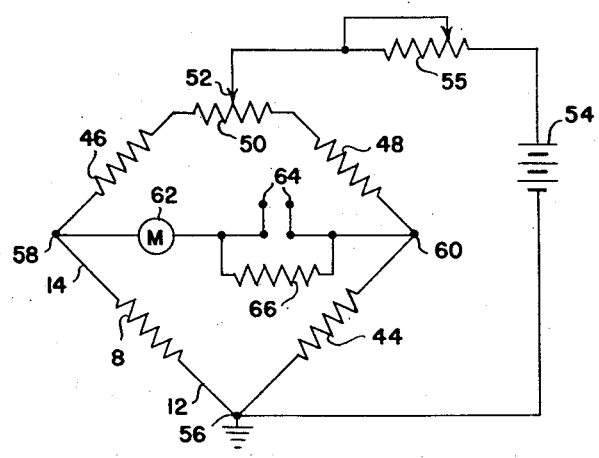
Figure 3 is a wiring diagram illustrating the apparatus employed in making measurements of temperature.

The electrical arrangement provided for temperature measurement is indicated in Figure 3, wherein the thermistor resistance is indicated at 8, the respective grounded lead 12 and ungrounded lead 14 being indicated therein. The thermistor resistance is connected in a Wheatstone bridge comprising the additional resistor elements 44, 46 and 48, the two latter being joined by a potentiometer 50, the sliding contact 52 of which is connected through a variable resistance 55 and battery 54 to the grounded junction 56 between resistor 54 and the sheath of the cable which is connected to lead 12. Between the terminals 58 and 60 of the bridge there is arranged in series a microammeter 62 and a pair of terminals 64 to which may be connected a recording microammeter if that is desired. A resistor 66 may normally shunt the terminals 64. For most purposes, the meter 62 may be calibrated in terms of temperature, preliminary adjustment at known temperature being made through the contact 52 of potentiometer 50. For more precise measurement, the bridge may be operated in null fashion, the contact 52 being adjusted to secure a null reading on meter 62. In such case, the position of the contact 52 may be used to indicate temperature.

Figure 4:
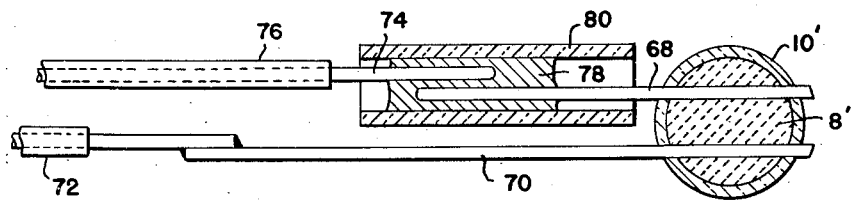
Figure 4 is a fragmentary view showing the modification of the construction involved which is particularly useful in the provision of thermistor elements for catheters.

Reference may now be made to the application of the invention to a catheter and this is indicated in Figure 4. The catheter proper, which is not shown, may be of any usual flexible type and in its tip there is located the assembly illustrated in Figure 4 comprising the thermistor bead 8′ coated with glass 10′. The thermistor leads 68 and 70 in this case are cut to extend from the same side of the thermistor bead. The longer lead 70 is soldered to the end of the conductor 72 of an insulated lead which passes through the catheter. The shorter lead 68 is soldered to the end of the conductor 74 of a second insulated wire 76, the soldering being effected as at 78 within a glass or other insulating tube indicated at 80 which provides insulation and also forms a soldering jig as previously described. In the case of a catheter, the dimensions of the elements involved may not need to be so minute as those described in connection with the hypodermic needle, but the invention is applicable irrespective of the dimensions involved. The catheter itself is, of course, of suitable dimensions for the particular use involved. The reading or recording system of Figure 3 may, obviously, be used in connection with such a catheter.

What is claimed is:

1. A resistance thermometer comprising a tubular housing, a thermistor bead located within said housing and provided with a pair of leads embedded therein and projecting therefrom, an insulating capillary tube receiving one of said leads, a conductor also located within said insulating capillary tube adjacent to the last mentioned lead, and solder within said insulating capillary tube electrically joining said last mentioned lead and said conductor.

2. A resistance thermometer comprising a pointed hypodermic needle having a bore, and a thermistor bead located within said bore adjacent to the needle point and provided with a pair of leads embedded therein and projecting oppositely therefrom, one of said leads being secured to the wall of said bore adjacent to the needle point.

3. A resistance thermometer according to claim 2 in which the last mentioned lead is soldered to the wall of said bore.

4. A resistance thermometer according to claim 3 in which the solder closes the end of the bore at the needle point.

5. A resistance thermometer according to claim 1 in which the thermistor bead is insulated by a glass coating.

6. A resistance thermometer according to claim 2 in which the thermistor bead is insulated by a glass coating.

7. The method of making a resistance thermometer comprising the steps of providing a thermistor bead having a pair of leads embedded therein and projecting therefrom, locating one of said leads and an electrical conductor within an insulating capillary tube in adjacent relationship with each other, and soldering said lead and conductor together using said capillary tube as a jig confining the solder.

8. The method of making a resistance thermometer comprising the steps of providing a thermistor bead having a pair of leads embedded therein and projecting therefrom, locating one of said leads and an electrical conductor within an insulating tube in adjacent relationship with each other, soldering said lead and conductor together using said tube as a jig confining the solder, inserting the assembly thus produced within the bore of a hypodermic needle, and securing the other of said leads to the wall of the needle bore adjacent to the needle point.

9. The method of making a resistance thermometer comprising the steps of providing a thermistor bead having a pair of leads embedded therein and projecting therefrom, locating one of said leads and an electrical conductor within an insulating tube in adjacent relationship with each other, soldering said lead and conductor together using said tube as a jig confining the solder, inserting the assembly thus produced within the bore of a hypodermic needle, and soldering the other of said leads to the wall of the needle bore adjacent to the needle point.

10. The method of making a resistance thermometer comprising the steps of providing a thermistor bead having a pair of leads embedded therein and projecting therefrom, locating one of said leads and an electrical conductor within an insulating tube in adjacent relationship with each other, soldering said lead and conductor together using said tube as a jig confining the solder, inserting the assembly thus produced within the bore of a hypodermic needle, and soldering the other of said leads to the wall of the needle bore adjacent to the needle point, the solder being applied in sufficient amount to close said bore.

11. The method according to claim 7 in which the electrical conductor and the lead are located in overlapping relationship in the insulating tube.

12. A resistance thermometer comprising a tubular housing, a thermistor bead located within said housing and provided with a pair of leads embedded therein and projecting therefrom, an insulating capillary tube receiving one of said leads, a conductor also located within said insulating capillary tube in overlapping relation with the last mentioned lead, and solder within said insulating capillary tube electrically joining said last mentioned lead and said conductor.

13. A resistance thermometer comprising a tubular housing in the form of a pointed hypodermic needle, a thermistor bead located within said housing and provided with a pair of leads embedded therein and projecting therefrom, an insulating capillary tube receiving one of said leads, a conductor also located within said insulating capillary tube adjacent to the last mentioned lead, and solder within said insulating capillary tube electrically joining said last mentioned lead and said conductor.

14. A resistance thermometer comprising a tubular housing in the form of a pointed hypodermic needle, a thermistor bead located within said housing and provided with a pair of leads embedded therein and projecting therefrom, an insulating tube receiving one of said leads, a conductor also located within said insulating tube adjacent to the last mentioned lead, and solder within said insulating tube electrically joining said last mentioned lead and said conductor, the other of said leads being conductively secured to the inside of said needle.

15. A resistance thermometer comprising a tubular housing in the form of a pointed hypodermic needle, a thermistor bead located within said housing and provided with a pair of leads embedded therein and projecting therefrom, an insulating tube receiving one of said leads, a conductor also located within said insulating tube adjacent to the last mentioned lead, and solder within said insulating tube electrically joining said last mentioned lead and said conductor, the other of said leads being soldered to the inside of said needle.

16. A resistance thermometer comprising a tubular housing in the form of a pointed hypodermic needle, a thermistor bead located within said housing and provided with a pair of leads embedded therein and projecting therefrom, an insulating tube receiving one of said leads, a conductor also located within said insulating tube adjacent to the last mentioned lead, and solder within said insulating tube electrically joining said last mentioned lead and said conductor, the other of said leads being soldered to the inside of said needle and the last mentioned solder closing the end of the bore of said needle.

References Cited in the file of this patent

UNITED STATES PATENTS

| 2,321,846 | Obermaier | June 15, 1943 |
| 2,407,288 | Kleimack et al. | Sept. 10, 1946 |